UNITED STATES PATENT OFFICE.

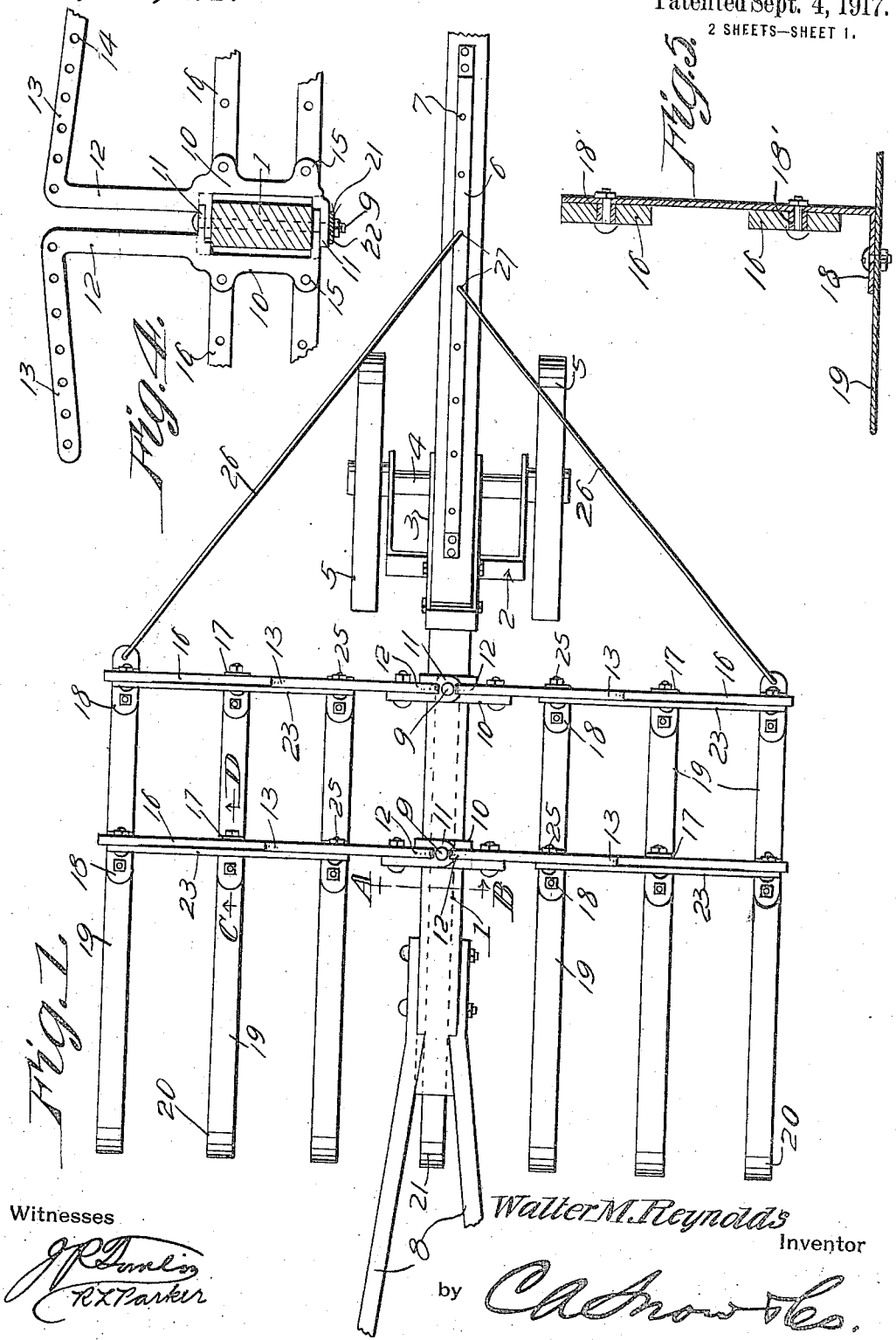

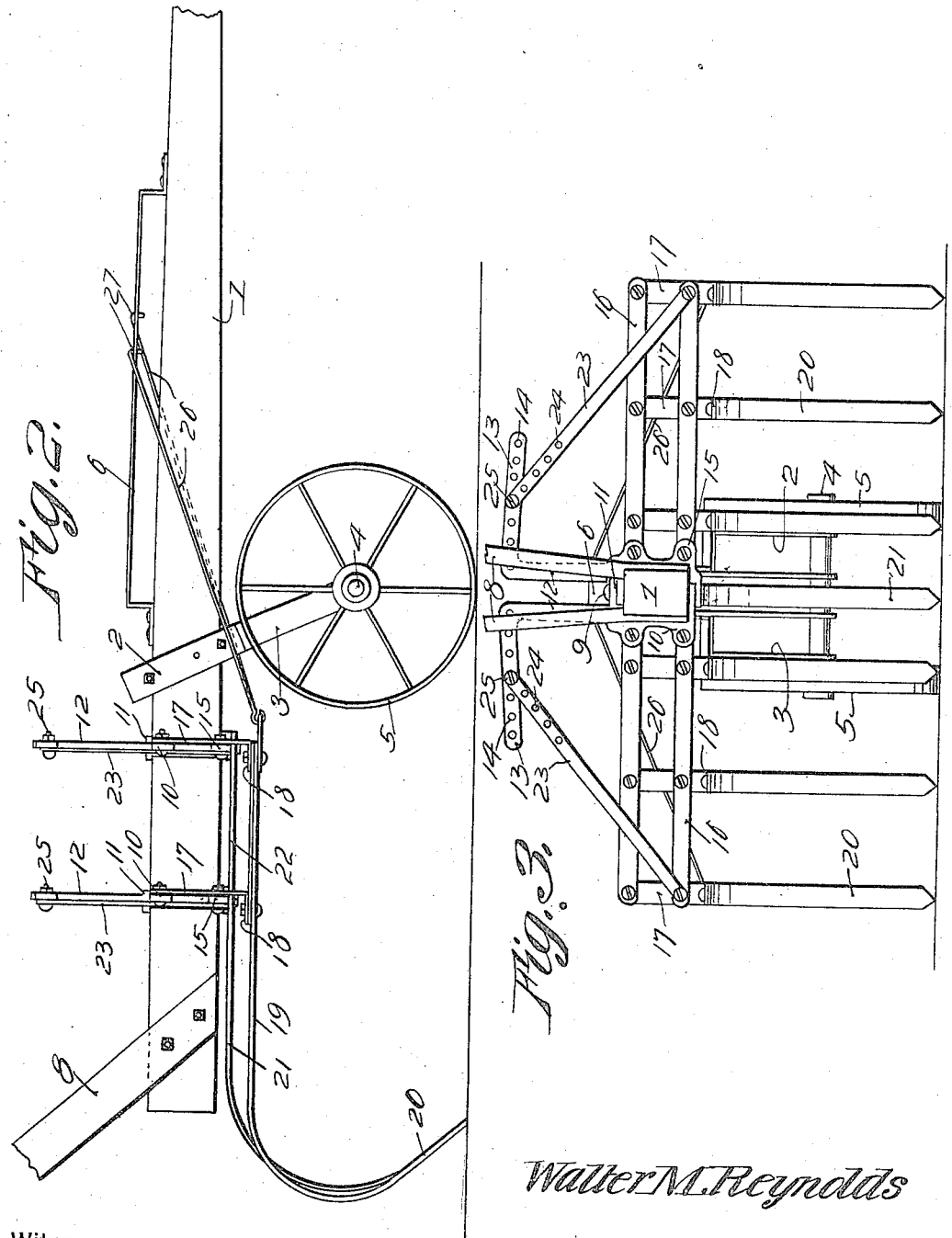

WALTER M. REYNOLDS, OF HATTIESBURG, MISSISSIPPI, ASSIGNOR OF ONE-HALF TO JAMES B. MERKEL, OF HATTIESBURG, MISSISSIPPI.

CULTIVATOR.

1,238,821.  Specification of Letters Patent.  Patented Sept. 4, 1917.

Application filed June 21, 1916. Serial No. 105,023.

*To all whom it may concern:*

Be it known that I, WALTER M. REYNOLDS, a citizen of the United States, residing at Hattiesburg, in the county of Forest and State of Mississippi, have invented a new and useful Cultivator, of which the following is a specification.

This invention relates to cultivators, one of its objects being to provide a cultivator the teeth of which can be adjusted angularly from front to rear and can also be adjusted angularly in a vertical direction, means being employed whereby the teeth of the cultivator will at all times be kept at the proper angle to the horizontal irrespective of the adjustments.

A further object is to provide a cultivator the teeth of which are disposed in groups, it being possible to so adjust the groups that the machine may be used as a straddle row cultivator or, can be used to cultivate between the rows.

Another object is to provide simple and efficient means whereby the groups of teeth can be held in any positions to which they may be adjusted.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

In said drawings:—

Figure 1 is a plan view of a cultivator embodying the present improvements.

Fig. 2 is a side elevation thereof.

Fig. 3 is a rear elevation.

Fig. 4 is an enlarged vertical transverse section through a portion of the cultivator, said section being taken on the line A—B Fig. 1.

Fig. 5 is an enlarged vertical longitudinal section, said section being taken on the line C—D Fig. 1.

Referring to the figures by characters of reference 1 designates a beam to which is secured a yoke 2 extending downwardly therebelow. This yoke has depending arms 3 which form a central fork. Extending transversely through the yoke and the arms 3 is a shaft 4. Where the machine is to be used as a straddle row cultivator, supporting wheels 5 are designed to be mounted upon the end portions of the shaft 4 and beyond the sides of the yoke, as shown particularly in Figs. 1 and 3. Where the machine is to be used for cultivating between rows, a single wheel is adapted to be placed on the shaft and between the arms 3.

Arranged longitudinally upon the beam 1 and in front of the yoke 2 is a holding strip 6 provided at intermediate points with apertures 7. Handles 8 may be extended upwardly and rearwardly from the rear portion of the beam 1.

Extending through the beam between the handles 8 and the yoke 2 are front and rear pivot bolts 9. Pivotally mounted on each of these bolts are opposed yokes 10 which straddle opposed sides of the beam 1, each yoke having terminal ears 11 through which the bolt 9 extends and the ears of the two yokes being arranged in lapped relation. This is shown particularly in Fig. 4. Upstanding from each of the yokes 10 is a standard 12 provided with a laterally extending arm 13 in which are formed openings 14.

Laterally extending ears 15 are provided upon the upper and lower portions of each yoke and pivotally connected to these superposed ears are the upper and lower members 16 of a parallelogram, these members being connected at their outer ends and at intermediate points, by links 17 which project below the lower member of the parallelogram and merge into rearwardly extending feet 18. Extending under the front and rear parallelograms and pivotally connected to the corresponding feet on said parallelograms are the forwardly extending upper portions 19 of cultivator teeth 20. A similar central cultivator tooth 21 has its forwardly extending portion secured in place by the pivot bolts 9, there being nuts 22 upon the lower ends of these bolts which, when removed, permit the tooth 21 to be easily detached from or placed in position.

Pivotally connected to the outer end of each of the parallelograms is a brace 23 having a series of openings 24 any one of which is adapted to receive a fastening bolt 25 which may be inserted into any one of the openings in the adjacent arm 13. Thus it will be seen that the parallelogram can be adjusted angularly upwardly and downwardly and after a desired adjustment has been effected, it can be held in position by securing the brace 23 to the arm 13.

Pivotally connected to the front end of each of the side feet 19 is a restraining rod 26 and the front ends of these rods are hooked, as shown at 27 so as to be readily insertible into any of the openings 7, thus to hold the parallelograms and the teeth carried thereby in any positions to which they may be adjusted forwardly or rearwardly about the pivots 9.

In order to reduce wear and allow the parts to work freely about their pivots, each of the pivotal connections is preferably provided with a bushing such as indicated at 28 in Fig. 5.

As has heretofore been pointed out, when the machine is to be used as a straddle row cultivator, two wheels 5 are employed, the same being arranged as indicated in Figs. 1 and 3. The braces 23 are adjusted upwardly or downwardly so as to cause the parallelograms to move upwardly or downwardly until the feet have been brought into positions to engage the sides of the hill. Braces 23 are then resecured. The parallelograms can be adjusted forwardly or rearwardly about their pivots 9 and then held by the restraining rods 26. The middle tooth 21 is to be detached so as not to injure the growths being cultivated.

Where the structure is to be used for cultivating between rows, a single wheel 5 is to be employed, the same being mounted between the arms 3. The parallelograms can then be adjusted upwardly at their outer ends so as to engage the sides of adjoining hills. Likewise these parallelograms can be adjusted forwardly or rearwardly about their pivots 9.

What is claimed is:—

1. A cultivator, comprising a beam, yokes pivotally secured to the beam, standards rising from the yokes, arms extending from the standards, parallelograms pivotally secured to the yokes, feet secured to the parallelograms, cultivator teeth secured to the feet, links connecting the parallelograms to the arms for adjusting the parallelograms about horizontal axes, and means for adjusting the parallelograms about vertical axes.

2. A cultivator, comprising a beam, yokes pivotally secured to the beam, standards rising from the yokes, arms extending from the standards, spaced ears on the yokes and extending laterally from the beam, parallelograms pivotally secured to the ears, links pivotally secured to the parallelograms and adjustably attached to the arms for adjusting the parallelograms about horizontal axes, a retaining strip secured to the beam, rods secured to the parallelograms and adjustably attached to the retaining strip for adjusting the parallelograms about vertical axes, and cultivator teeth secured to the parallelograms.

In testimony that I claim the foregoing as my own, I have hereto affixed my signature in the presence of two witnesses.

WALTER M. REYNOLDS.

Witnesses:
W. W. CAIG,
W. F. PATTY.